United States Patent

Shiba

[15] 3,693,437
[45] Sept. 26, 1972

[54] MOVABLE VENTURI TYPE TUBE FLOW METER

[72] Inventor: Kamekichi Shiba, No. 159, Kagocho, Bunkyo-ku, Tokyo, Japan

[22] Filed: Jan. 26, 1971

[21] Appl. No.: 109,815

Related U.S. Application Data

[63] Continuation-in-part of Ser. No. 743,200, July 8, 1968, which is a continuation-in-part of Ser. No. 500,666, Oct. 22, 1965, Pat. No. 3,429,181.

[52] U.S. Cl. .................................. 73/194 M, 73/213
[51] Int. Cl. ......................................... G01f 1/00
[58] Field of Search ... 73/194 M, 198, 205, 211, 212, 73/213, 228

[56] References Cited

UNITED STATES PATENTS

| | | | |
|---|---|---|---|
| 2,364,930 | 12/1944 | Turner | 252/52 |
| 2,538,785 | 1/1951 | Karig | 70/119 |
| 2,804,771 | 9/1957 | Brown | 73/228 |
| 2,975,635 | 3/1961 | Kindler | 73/194 |
| 2,987,915 | 6/1961 | Hildenbrandt | 73/211 |
| 2,995,933 | 8/1961 | Patton | 73/213 |
| 3,104,549 | 9/1963 | Humbert et al. | 73/228 |
| 3,333,468 | 8/1967 | Jacobs | 73/194 |
| 3,374,674 | 3/1968 | Schwartzman | 73/213 |

*Primary Examiner*—James J. Gill
*Attorney*—Michael S. Striker

[57] ABSTRACT

A flow meter for measuring the rate of flow of a liquid regardless of the viscosity losses. The flow meter includes an axially movable Venturi tube arranged between a pair of stationary tubes coaxial with the Venturi tube and respectively feeding liquid to be measured in and out of the Venturi tube, first actuator means connected to the Venturi tube for movement therewith in axial direction during flow of liquid through the latter, second actuator means actuated by the pressure in the liquid at the inlet and outlet end of the Venturi tube, and means for determining the actual flow of liquid through the Venturi tube, which means is actuated by the first and second actuator means.

14 Claims, 9 Drawing Figures

INVENTOR
KAMEKICHI SHIBA

ATTORNEY

INVENTOR
KAMEKICHI SHIBA

Michael S. Striker
ATTORNEY

FIG.7
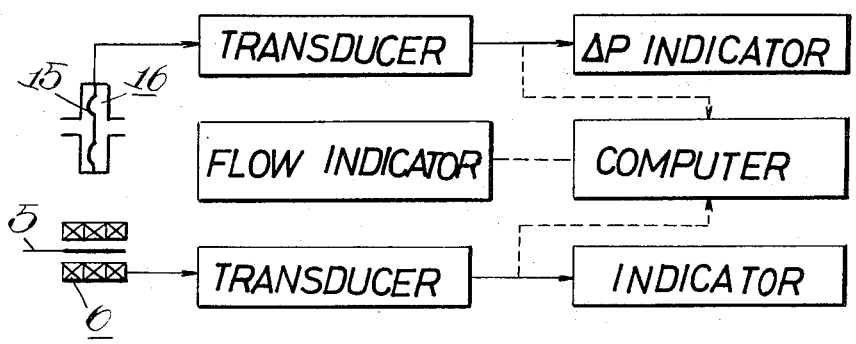
FIG.8
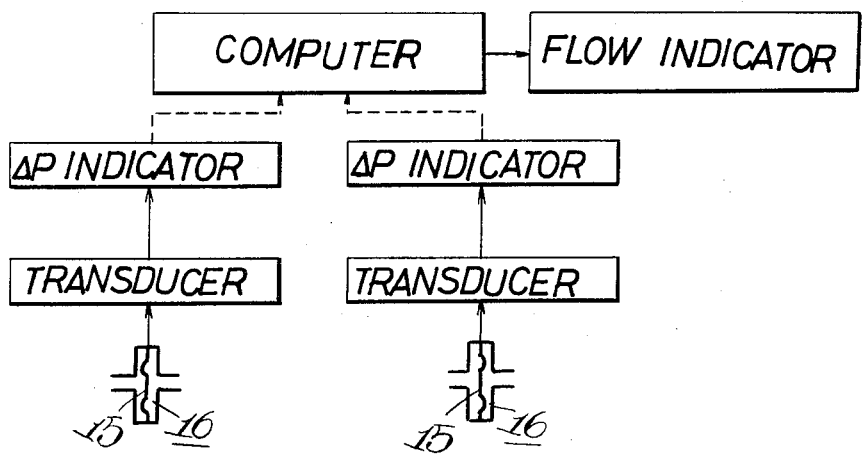
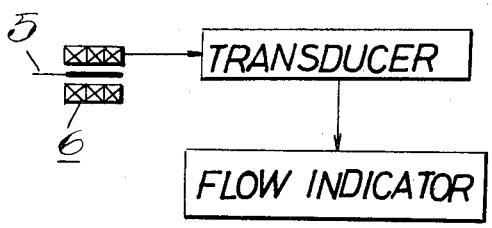
FIG.9

MOVABLE VENTURI TYPE TUBE FLOW METER

CROSS REFERENCE TO RELATED APPLICATIONS

The present application is a continuation-in-part Application of the copending application Ser. No. 743,200, filed July 8, 1968, which in turn is a continuation-in-part Application of the application Ser. No. 500,666, filed Oct. 22, 1965 and now U.S. Pat. No. 3,429,181.

BACKGROUND OF THE INVENTION

This invention relates to a movable Venturi type tube flow meter.

Conventional flow meters in which the flow rate of fluid passing through a conduit is obtained by measuring its pressure and the like, are mostly based on Bernouilli's theorem. However, said theorem is based on the law of conservation of energy so far as said energy is mechanical, and it is not applicable in every instance, i.e., it is inapplicable in cases in which the viscosity of the fluid is not negligible.

The movable Venture type tube flow meter of the present invention is a hydrodynamical flow meter which is not based on Bernouilli's theorem, and hence it enables the measurement of a flowrate in every instance, that is, even in an instance where Bernoilli's theorem is not applicable.

Though the law of conservation of energy generally holds true in all cases when all kinds of energies are taken into account, said law does not hold true when the energies are limited to mechanical energy as in the case of proving the Bernouilli's theorem and especially when thermal energy and the like is additionally related to. Therefore, in the case when the viscosity of fluid cannot be ignored, Bernouilli'theorem is inapplicable.

Whereas, the law of conservation of momentum based on the law of motion, that is, the increase of momentum of a particle in an infinitesimal time $dt$ is equal to $dt$ times as great as the resultant of the external forces exerted on the particle holds true in every instance within the limits of Newton's dynamics. The present invention is based on this law.

It is to be noted that the terms "flow of fluid" herein after used are considered to imply "incompressible fluid of steady flow."

The working hypothesis of the flow meter according to the present invention will be explained hereinafter in detail.

The present flow meter comprises a pair of fixed and coaxial inlet and outlet tubes spaced from each other in axial direction, and a coaxial Venturi type tube movably connected to said inlet and outlet tubes by resilient means or elastic joints.

(1) The forces exerted on the fluid in the movable Venturi type tube are the force ΦA and ΦB given by the pressure onto the fluid at the inlet opening and outlet opening of the Venturi type tube, and the force $f$ by the Venturi type tube and the gravity thereof. Said force ΦA and ΦB can be expressed by the following equations in which $S_A$ and $S_B$ represent the sectional areas of the inlet opening A and outlet opening B of the Venturi type tube, P and $P_B$ the pressure working thereon, and the direction of flow is expressed in a positive sign.

$$\Phi A = S_A P_A \quad \Phi B = -S_B P_B$$

The gravity acting on the fluid in the Venturi type tube can be expressed by $V\rho g'$ in which V represents the capacity of the movable Venturi tube, $\rho$ the density of the fluid, $V\rho g'$ the component of acceleration of gravity in the flow direction.

Hence, the forces exerting on the fluid in the Venturi type tube are expressed as follows:

$$S_A P_A - S_b P_B + f + V\rho g'$$

(2) The increase of momentum which the fluid within the tube obtains in an infinitesimal time $dt$ is discussed hereinafter. It is observed that there is no change in momentum of the fluid while it is within the Venturi type tube, because in the tube the fluid forms a steady flow where the fluid is constantly replaced with replenished fluid. Whereas, at the inlet opening of the tube there exists the influx of momentum amounting to $\rho Q V_A dt$ since fluid having the mass of $\rho Q dt$ (Q being the voluminal flowrate of the fluid) flows thereinto at the speed $V_A$ and at the outlet opening there exists the outflow of momentum amounting to $\rho Q V_B dt$ ($V_B$ representing the flowing-out speed of fluid at the outlet opening B of the tube). Therefore, the increase of momentum of fluid within the tube in an infinitesimal time $dt$, amounts to $\rho Q(V_B - V_A)dt$.

With the above paragraphs (1) and (2) in which the forces working onto the fluid in the tube and the increase of momentum of the fluid during its passing through the tube in an infinitesimal time $dt$ are obtained and further in view of the law of conservation of momentum, following equation is obtained:

$$S_A P_A - S_B P_B + f + V\rho g' = \rho Q(V_B - V_A)$$

Following equation of continuity is also established, since the fluid to be measured by the present invention meter is incompressible fluid of a steady flow as described above.

$$Q = S_A V_A = S_B V_B$$

This equation is solved for $V_A$ and $V_B$ as follows:

$$V_A = Q/S_A, \quad V_B = Q/S_B$$

$V_A$ and $V_B$ in the aforementioned equation are substituted by the above values, and the following equation is obtained:

$$S_A P_A - S_B P_B + f + V\delta g' = \delta Q^2 \left(\frac{1}{S_B} - \frac{1}{S_A}\right) \quad (I)$$

The resultant of forces acting on the movable Venturi type tube is zero, when the tube stands still. Said resultant consists of the force $-f$ applied to the tube by the fluid flowing therein, that is, the reaction force of the aforementioned force $f$, the force $\Phi w$ resulting from the pressure exerted on members fitted to the tube at its opposite open ends, gravity and an external force F working on the tube to keep it in balance, said force F being, for example, the elasticity of the elastic joints fitted to the tube.

Among those forces, the force $\Phi w$ is expressed in the following equation, in which $S_A^*$ and $S_B^*$ represent effective areas of the members fitted to the movable Venturi type tube at its inlet and outlet openings and P represents the pressure outside of the Venturi tube.

$$\Phi w = S_A{}^* P_A - S_B{}^* P_B - (S_A{}^* + S_A)P + (S_B{}^* + S_B)P$$

Hence, the conditions of forces for balancing the movable Venturi type tube is established as follows, in which $\mu g'$ represents the gravity of mass $\mu$.

$$-f + S_A{}^* P_A - S_B{}^* P_B - (S_A{}^* + S_A)P + (S_B{}^* + S_B)P + F + \lambda g' = 0 \quad (II)$$

From the above equations (I) and (II), following equation is established:

$$(S_A{}^* + S_A)(P_A - P) - (S_B{}^* + S_B)(P_B - P) + F + (\mu + V\delta)g' = \delta Q^2 \left(\frac{1}{S_B} + \frac{1}{S_A}\right) \quad (III)$$

When the elastic joints fitted to the tube are bellows, $(S_A{}^* + S_A)$ and $(S_B{}^* + S_B)$ in the above equation will be substituted by $S'_A$ and $S'_B$ which correspond to each effective areas of the bellows.

Said equation (III) is a formulated working hypothesis of the present flow meter.

In said equation (III), if $S_B$ is equal $S_A$, the right side value of the equation becomes zero, to wit, the flowrate Q disappears from the equation, and consequently it is not possible to calculate said Q. Hence, it is prerequisite that $S_B$ is not equal to $S_A$. Though either $S_A$ or $S_B$ can be larger than the other, the description is made with reference to examples in which $S_A > S_B$. The movable Venturi type may be of any configuration provided that it has inlet and outlet openings of different sectional areas $S_A$ and $S_B$. When $S_A$ is larger than $S_B$, such type of tube will resemble a Venturi tube in which the cross sectional area of the tube gradually diminishes towards the outlet opening. The present invention meter can be placed in any direction, but it is most preferable to place it in a horizontal direction, because in this instance $g'$ becomes zero, so that the equation (III) will assume a simplified form as follows and so that the structure of the meter can also be simplified.

$$S'_A(P_A - P) - S'_B(P_B - P) + F = \delta Q^2 \left(\frac{1}{S_B} - \frac{1}{S_A}\right) \quad (IV)$$

The flowrate Q is obtainable from the above equation by measuring three factors, viz., $(P_A - P)$, $(P_B - P)$ and F. Said Q may be obtained by measuring only one or two of said three factors when the meter is modified in accordance with some of the following examples.

SUMMARY OF THE INVENTION

It is an object of the present invention to provide a flow meter, the construction of which is based on the above analysis, and especially to the flow meter which will properly indicate the rate of flow of a liquid passing therethrough regardless of viscosity losses.

It is a further object of the present invention to provide for a flow meter of the aforementioned type which is simple in construction and which will operate properly during extended use.

With these objects in view, the flow meter according to the present invention mainly comprises a Venturi tube having opposite ends of different cross sections and mounted movable in axial direction, means for admitting flowing liquid at one end and means for receiving the liquid after it has flowed through said Venturi tube at the other end thereof, first actuating means connected to the Venturi tube and actuated by and proportionately to movement of the same in axial direction during flow of the liquid therethrough, second actuating means actuated by the pressure in the liquid at the inlet and at the outlet end of the movable Venturi tube, and means for determining the actual flow of liquid through the Venturi tube, which last-mentioned means are actuated by the first and second actuating means.

The novel features which are considered as characteristic for the invention are set forth in particular in the appended claims. The invention itself, however, both as to its construction and its method of operation, together with additional objects and advantages thereof, will be best understood from the following desctiption of specific embodiments when read in connection with the accompanying drawing.

BRIEF DESCRIPTION OF THE DRAWING

FIGS. 7 – 9 schematically illustrate means connected to elements of the various embodiments shown in FIGS. 1–6 for indicating the flowrate of the liquid.

DESCRIPTION OF THE PREFERRED EMBODIMENTS

Figure 1:
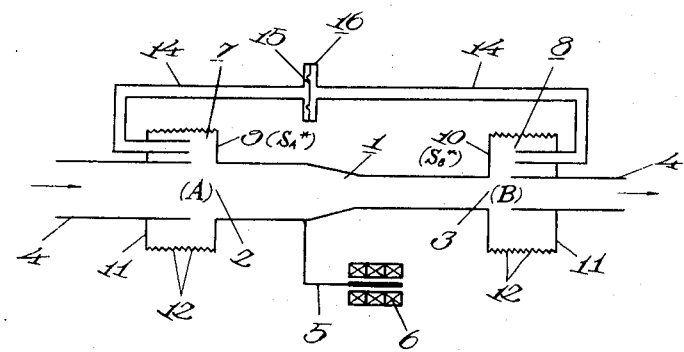
FIGS. 1 – 6 show embodiments of the invention meter in diagrammatic cross section.

Common to all embodiments is a tube 1 having an open end 2 of a comparatively large diameter $S_A$ and an opposite open end 3 of a comparatively small diameter $S_B$. Either said open ends with the diameter $S_A$ or $S_B$ can be utilized as an inlet of liquid to be measured by the meter. A pair of tubes 4,4 forming an inlet and outlet of the liquid into the meter are fixed spaced from each other coaxial with tube 1 and the latter is axially movable between facing ends of the tube 4.

The Venturi type tube 1 is arranged between the tubes 4,4 and is movably connected to the latter by elastic joints or resilient means 7,8 such as bellows, springs and the like. A movable detecting rod 5 in form of a magnetic core is fitted at one end of its ends directly or indirectly to the movable tube 1 and extends into a differential detecting means or coil 6.

The elastic joints 7 and 8 are constituted in the embodiments shown in FIGS. 1, 2, 3 and 5, by closed tubular elastic bodies 12,12 or bellows which are fluid-tightly extended between additional pressure-receiving annular members 9,10 having sectional areas $S_A{}^*$, $S_B{}^*$ and being circumferentially provided about the openings 2,3 of the tube 1, and annular flanges 11,11 fited about the fixed tubes 4,4 adjacent to their open ends. In FIG. 4, one of elastic joints 7 is similar to those in FIGS. 1,2,3 and 5, while the other joint 8 consists of coil springs provided between the opening 3 of the tube 1 and the fixed tube 4, which permit the flow of fluid past the springs into a sealed housing 17.

FIG. 1 illustrates a flow meter of the type in which flowrate Q is obtainable by measuring two values, i.e., the force F and the difference of pressure $(P_A - P_B)$.

The embodiment illustrated in FIG. 1, tubes 14,14 respectively fitted to the flanges 11,11 of the fixed tubes 4,4 and opening into bellows 7,8 are connected by a pressure-difference gauge 16 having a diaphragm 15. The difference of the pressure $P_A$ and $P_B$ at openings 2 and 3 of the movable Venturi type tube is thus applied to and measured by said gauge. Since in this embodiment, the sectional areas $S'_A$ and $S'_B$ of additional pressure receiving annular surfaces of the members 9,10 are made equal, $S'_A$, $S'_B$ and $S'$ in the equation (IV) become equal to establish the following equation.

$$S'(P_A - P_B) + F = \delta Q^2 \left(\frac{1}{S_B} + \frac{1}{S_A}\right)$$

This equation is solved for the flowrate Q as follows:

$$Q = \sqrt{\frac{S'(P_A - P_B) + F}{\left(\frac{1}{S_B} - \frac{1}{S_A}\right)\delta}} \quad (V)$$

The flowrate $Q$ is thus obtainable from this equation (V) by measuring its $F$ and $(P_A - P_B)$. As a movable detecting rod 5 fixed at its one end to the movable tube 1 displaces in accordance with the displacement of the tube 1, the value of displacement of the tube is measured by a differential detecting means 6 and the force $F$ which is proportioned to said value of displacement of the tube is obtainable. The difference of pressure $(P_A - P_B)$ is obtainable by the gauge 16, as above described.

FIG. 7 schematically indicates the means for determining the flowrate from the above values. As shown in FIG. 7 a pair of transducers are respectively connected to the diaphragm 15 of the pressure difference gauge 16 and to the coil 6 to produce signals corresponding to the deflection of the diaphragm 15 and the current induced in the coil 6 during movement of the core 5 relative thereto. The transducers are respectively connected to a pair of indicators and a computer which calculates, in a known manner from the signals received, the flow rate of the liquid passing through the flow meter so that the flowrate may be read from the flow indicator connected to the computer.

Figure 2:
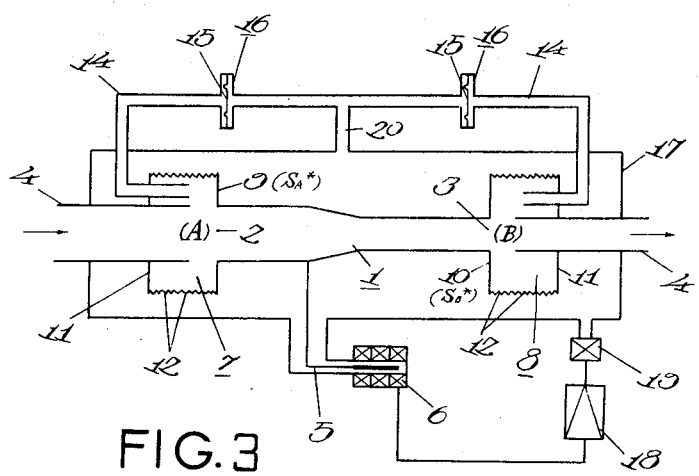

A flow meter of the type in which flowrate Q is obtainable by measuring two values of difference of pressure, i.e., the difference of pressure $(P_A - P)$ and $(P_B - P)$ is illustrated in FIG. 2.

In the embodiment illustrated in FIG. 2, the movable tube 1, the elastic joints 7,8, the movable detecting rod 5 and facing end portions of the fixed tubes 4,4 are all enclosed in a sealed housing 17, while the outer free ends of the fixed tubes 4,4 open to the outside of the housing. Electrical value of the displacement of the movable Venturi type tube 1 which is detected by the differential transformer 5,6 and amplified by an amplifier 18 operates a pressure regulating device 19 such as an electrically actuated pump connected to the sealed housing 17 to regulate the pressure in the housing to thus reduce the displacement of the tube 1 to zero. Since the displacement of the tube 1 is maintained at zero by regulating the pressure P at the outside of the tube 1 as above-described, the external force for balancing the tube becomes zero.

The equation (IV) is, therefore, convertible as follows:

$$S'_A(P_A - P) - S'_B(P_B - P) = \delta Q^2 \left(\frac{1}{S_B} - \frac{1}{S_A}\right)$$

This equation is further solved for the flowrate Q to give the following equation.

$$Q = \frac{S'_A(P_A - P) - S'_B(P_B - P)}{\left(\frac{1}{S_B} - \frac{1}{S_A}\right)\delta} \quad (VI)$$

From this equation, the flowrate $Q$ is obtainable by measuring the difference of pressure $(P_A - P)$ and $(P_B - P)$. The pressure differences $(P_A - P)$ and $(P_B - P)$ are measured by pressure difference measuring gauges 16,16 provided at the outside of the sealed housing and each having two pressure chambers separated by a diaphragm 15, one of said chambers of one gauge communicates with the interior of the bellows 7 through a connecting tube 14, and one of the chambers of the other gauge communicates with the interior of the bellows 8 through a similar connecting tube 14. The other chamber of each gauge communicates with the interior of the sealed housing 17 through a tube 20. Since the pressure F at the outside of the movable tube 1 does not appear in the equation (VI) when $S'_A$ is equal to $S'_B$, and consequently the pressure F cannot be obtained from the equation, it is prerequisite to construct the meter so as to have the $S'_A$ which is not equal to $S'_B$.

FIG. 8 schematically illustrates the means connected to the diaphragms 15 of the two pressure difference gauges 16 of the embodiment illustrated in FIG. 2 for determining the flowrate. As shown in FIG. 8 a pair of transducers are respectively connected to the two diaphragms to produce signals corresponding to the deflection of the diaphragms and the transducers are connected over pressure difference indicators to a computer which calculates in a known manner from the signals received, the flowrate of the liquid passing through the flow meter so that the flowrate may be read from the flow indicator connected to the computer.

Figure 3:
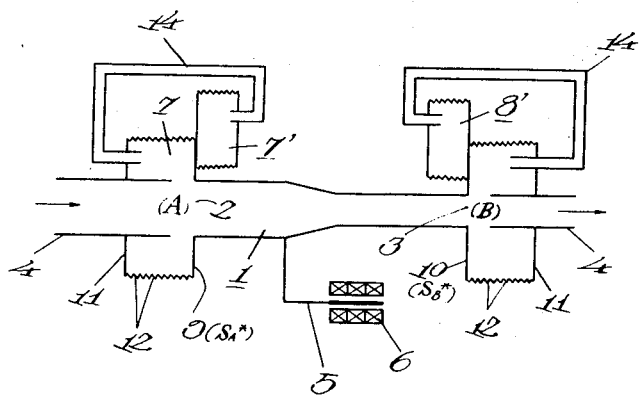
Figure 4:
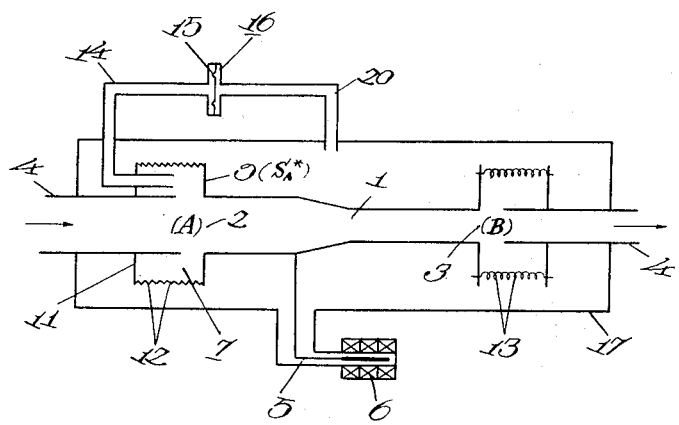

A meter of the type in which flowrate Q is obtainable by solely measuring a single value, i.e., the force F' is illustrated in FIG. 3.

In the embodiment illustrated in FIG. 3, which is of most simple construction, the flowrate Q of the fluid is obtained by simply measuring a single value of F which is the external force exerted on the movable tube 1. In this embodiment, a pair of connecting tubes 14,14 communicate with one end respectively with the interior of the bellows 7 or 8 and with the other end respectively with auxiliary bellows 7' or 8' having an effective area equal to that of additional pressure-receiving surfaces of the members 9,10. The free ends or the movable plates of said auxiliary bellows 7',8' which oppose each other are connected to the movable tube 1, i.e., respectively to the members 9 and 10 connected to the opposite ends of tube 1.

In the meter of the above constructions, the force F working on the movable tube 1 may be expressed by the following equation, in which F' is the elasticity of the bellows 7,8 and 7',8'. Said value is proportioned to the displacement value of the tube 1.

$$F = F' - (S_A^* + S_A)P_A + (S_B^* + S_B)P_B = F' - S_A'P_A + S_B'P_B$$

The equation (IV) is, therefore, convertible as follows:

$$F' = \delta Q^2 \left(\frac{1}{S_B} - \frac{1}{S_A}\right)$$

This equation is solved for $Q$ to obtain the following equation:

$$Q = \sqrt{\frac{F'}{\delta\left(\frac{1}{S_B} - \frac{1}{S_A}\right)}} \quad (VII)$$

The flowrate $Q$ is thus obtainable by detecting through the differential transformer 5,6 the $F'$ which is proportioned to the displacement value of the tube 1 as above-described.

As shown in FIG. 9, the coil 6 is connected to a transducer which produces a signal corresponding to the current produced in the coil 6 in accordance with the shifted position of the core 5 relative thereto so that the flowrate may be read on a flow indicator connected to the transducer.

A meter of the type in which the flowrate Q is obtainable from two values is illustrated in FIG. 4.

In this embodiment illustrated in FIG. 4, the pressure at the outside of the tube 1 is made equal to $P_B$ of $P_A$. For this purpose, a sealed housing 17 encloses the tube 1, the joints 7,13, and the fixed tubes 4,4 which are fluid-tightly fitted to the housing 17 and which extend beyond opposite ends of the housing. One of the joints 13 comprises a plurality of springs arranged spaced from each other in the housing 17. By making the structures of the meter as illustrated in FIG. 4 in which one of the joints 7 and the scaled housing 17 are connected by tubes 14 and 20 with a gauge 16 having a diaphragm 15 therebetween, the force P becomes equal to the force $P_B$. The flowrate Q is thus obtainable by measuring $(P_A - P_B)$ and the external force F exerted onto the tube 1. The equation (IV) is converted in this instance as follows:

$$S'_A(P_A - P_B) + F = \delta Q^2 \left(\frac{1}{S_B} - \frac{1}{S_A}\right)$$

This equation is further solved for Q to obtain the following equation:

$$Q = \sqrt{\frac{B'_A(P_A - P_B) + F}{\left(\frac{1}{S_B} - \frac{1}{S_A}\right)\delta}} \qquad (VIII)$$

In this embodiment, the arrangement as illustrated in FIG. 7 is used for determining the flowrate of the liquid passing through the meter and the elements illustrated in FIG. 7 are connected to each other and to the coil 6 and the diaphragm 15 as described above in connection with the embodiment shown in FIG. 1.

The embodiments shown in FIGS. 1–4 comprise first and second actuating means cooperating with means for determining the actual flow of liquid through the flow meter. The first actuating means in each embodiment comprise a magnetic core 5 fixed to the venturi tube 1 for movement therewith in axial direction and a coil 6 surrounding the core. The second actuating means are actuated by the pressure of liquid at the inlet end and at the outlet end of the venturi tube and they are constituted in the embodiments shown in FIGS. 1, 2 and 4 by pressure-differential gauges 15, 16 and in the embodiment of FIG. 3 by auxiliary bellow 7', 8'.

In the embodiments shown in FIGS. 1 and 4, the first and second actuating means act directly on the means for determining flow of liquid, whereas in the embodiment of FIG. 2, the first actuating means, and in the embodiment the second actuating means restrict movement of the venturi tube during change of flow of liquid and act thus indirectly on the means for determining flow of liquid through the flow meter.

Figure 5:
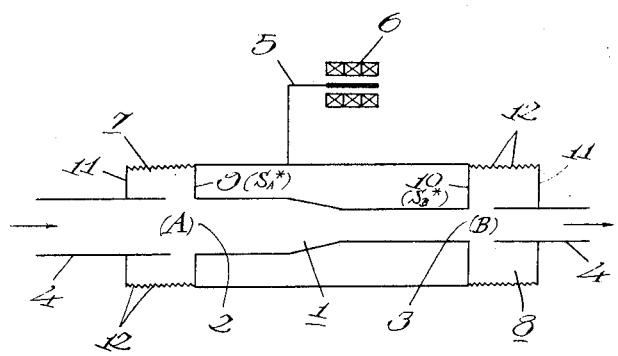

A meter of the type in which the flowrate $Q$ is obtainable through measuring a single value of the force $F$ is illustrated in FIG. 5.

FIG. 5 illustrates an embodiment in which Bernouilli's theorem holds true. When said theorem is applicable, following relation exists between the difference of pressure $(P_A - P_B)$ and flowrate $Q$.

$$P_A - P_B = \tfrac{1}{2}\delta Q^2 \left(\frac{1}{S'_B} - \frac{1}{S'_A}\right) \qquad (IX)$$

When the equation (V) is rewritten in view of the above equation (IX) provided that $S'_A = S'_B = S'$, the following equation (X) is obtained.

$$F = \tfrac{1}{2}\delta Q^2 \left(\frac{1}{S_B} - \frac{1}{S_A}\right)\left(2 - \frac{S'}{S_B} - \frac{S}{S_A}\right) \qquad (X)$$

The flowrate $Q$ is, thus, obtainable by simply measuring said force $F$ by the core 5 connected to the Venturi tube 1 for movement therewith and the coil 6 cooperating with the core. The means for detecting the difference of pressure $P_A$, $P_B$ illustrated in FIG. 1 is no longer necessary in this embodiment and eliminated therefrom.

Figure 6:
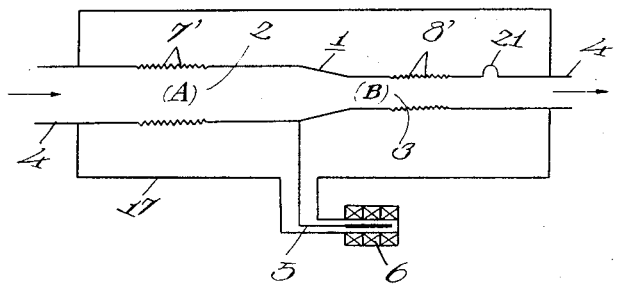

In the embodiment illustrated in FIG. 6, the means for detecting the difference of pressure $P_A$, $P_B$ are eliminated as in the embodiment of FIG. 5, and the movable tube 1 and fixed tubes 4,4 are connected by elastic tubes 7',8' such as bellows of diameters corresponding to those of the movable tube and fixed tubes. Contrary to other embodiments, the tube 1 in this embodiment is not provided with additional pressure-receiving members such as the one indicated by numerals 9,10 in FIGS. 1 to 5. A sealed housing surrounds the tube 1, the joints 7' and 8' and the inner portions of the fixed tubes 4. In order to make the pressure in the sealed housing 17 equal to $P_B$, one of the fixed tubes 4 is provided with a pressure regulating portion 21 which is either a pore or a soft membrance. The flowrate is, thus, obtainable in this embodiment by detecting the displacement value of the tube, by a differential transformer 5,6 of a construction as described above.

In the embodiments shown in FIGS. 5 and 6, the coil 5 of the differential transformer is connected to a transducer as shown in FIG. 9 so that the flowrate may be read on the flow indicator connected to the transducer.

It will be understood that each of the elements described above, or two or more together, may also find a useful application in other types of movable Venturi type flow meters differing from the types described above.

While the invention has been illustrated and described as embodied in a movable Venturi type flow meter for correctly indicating the flowrate regardless of the viscosity of the liquid to be metered, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the follow claims.

What is claimed as new and desired to be protected by Letters Patent is set forth in the appended

1. A flow meter comprising a Venturi tube having opposite ends of different cross sections and being mounted movable in an axial direction along a horizontal axis; first fixed means for supplying flowing liquid at one end and second fixed means for receiving the liquid after it has flowed through said Venturi tube at the other end thereof; first resilient means connecting said first fixed means to said one end of said Venturi tube and second resilient means connecting said other end to said second fixed means to bias said Venturi tube to a neutral position in the absence of flow of liquid; first actuating means connected to said Venturi tube and actuated by and proportionately to movement of the same in said axial direction during flow of said liquid therethrough; second actuating means actuated by the pressure of said liquid at said inlet and the pressure at said outlet end of said Venturi tube; and means for determining the actual flow of liquid through said Venturi tube, said last-mentioned means being responsive to said first and second actuating means.

2. A flow meter as defined in claim 1, wherein said first fixed means for supplying liquid at one end and said second fixed means for receiving the liquid at the other end of said Venturi tube comprise a pair of stationary tubes aligned with and respectively arranged axially spaced from said opposite ends of said Venturi tube.

3. A flow meter as defined in claim 2, wherein said first actuating means comprises a magnetic core connected to said Venturi tube for movement therewith in axial direction and a stationary coil surrounding said core.

4. A flow meter as defined in claim 3, wherein said resilient means comprise a pair of bellows respectively forming a pair of chambers about said opposite open ends of said Venturi tube and the adjacent ends of said stationary tubes, and wherein said second actuating means comprise pressure difference gauge means including diaphragm means and passage means leading from said chambers to opposite sides of said diaphragm means so as to deflect the latter in dependence on the difference of the pressure of the liquid at said opposite ends of said Venturi tube.

5. A flow meter as defined in claim 4, wherein said means for determining actual flow of liquid through said Venturi tube comprise a pair of transducer means connected to said diaphragm means and said stationary coil, respectively, and computer means connected to said transducer means.

6. A flow meter as defined in claim 4, and including a fluid-tight housing surrounding said Venturi tube and said bellows connected thereto, means connected to said first actuating means for regulating the pressure in said housing so as to maintain said Venturi tube in said neutral position, said second actuating means comprising a pair of pressure difference gauge means, each including a diaphragm, and passage means for transmitting the fluid pressure in one of said chambers and that in the interior of said housing respectively to opposite sides of one of said diaphragms and the fluid pressure in the other of said chambers and that in the interior of said housing respectively to opposite sides of the other said diaphragms.

7. A flow meter as defined in claim 6, wherein said means for determining actual flow of liquid through said Venturi tube comprises a pair of transducer means respectively connected to the diaphragms of said pair of pressure difference gauge means and computer means connected to said transducer means.

8. A flow meter as defined in claim 6, and including radially outwardly extending pressure receiving members fixed to and surrounding said open ends of said Venturi tube, said pair of bellows being respectively fixed to the outer peripheries of said pressure receiving members so that one side of each pressure receiving member is subjected to the pressure of the liquid in the respective chamber and the other side to the pressure of the liquid in said housing.

9. A flow meter as defined in claim 4 and including radially outwardly extending pressure receiving members fixed to and surrounding said open ends of said Venturi tube, said pair of bellows being respectively fixed to the outer peripheries of said pressure receiving members so that the latter are subjected to the pressure of the liquid in said chambers.

10. A flow meter as defined in claim 9, wherein said radially outwardly extending pressure receiving members are annular members having equal outer diameters.

11. A flow meter as defined in claim 3, wherein said resilient means comprises a bellows forming a chamber about one of said opposite open ends of the Venturi tube and the adjacent end of the corresponding one of said stationary tube so as to form a chamber about said adjacent ends, and spring means between the other end of said Venturi tube and the adjacent end of the other of said stationary tubes, and including a fluid-tight housing surrounding said Venturi tubes and said resilient means, said spring means being arranged so that the space between said other end of said Venturi tube and said adjacent end of the other stationary tube communicates with the interior of said housing whereby the latter will be filled with liquid passing through the Venturi tube, and the liquid in the housing will be maintained at a pressure equal to the pressure at said other end of said Venturi tube, said second actuating means comprising difference gauge means including a diaphragm and passage means for transmitting the pressure of the liquid in said chamber and in the interior of said housing respectively to opposite sides of said diaphragm.

12. A flow meter as defined in claim 11, wherein said means for detecting actual flow of liquid through said Venturi tube comprises a pair of transducer means respectively connected to said diaphragm and said coil, and computer means connected to said transducer means.

13. A flow meter as defined in claim 3, and including radially outwardly extending pressure receiving members fixed to and surrounding said open ends of said Venturi tube, said resilient means comprise a pair of bellows respectively connected to the outer peripheries of said pressure receiving members and forming a pair of chambers about said opposite ends of said Venturi tube and the adjacent ends of said stationary tubes, and wherein said second actuating means comprise a pair of additional bellow means each including a movable plate and a stationary plate, and a pair of passage means respectively providing communication between the interior of said pair of chambers and the interior of said pair of additional bellows, the movable plates of said pair of additional bellows being respectively fixed to said pressure receiving members and having respectively effective pressure receiving areas equal to that of said members.

14. A flow meter as defined in claim 13, wherein said means for detecting actual flow of liquid through said Venturi tube comprises transducer means connected to said stationary coil and flow indicator means connected to said transducer means.

* * * * *